March 19, 1935.  R. R. SANDERSON  1,994,792
DRILL BIT
Filed Aug. 8, 1932   2 Sheets-Sheet 2

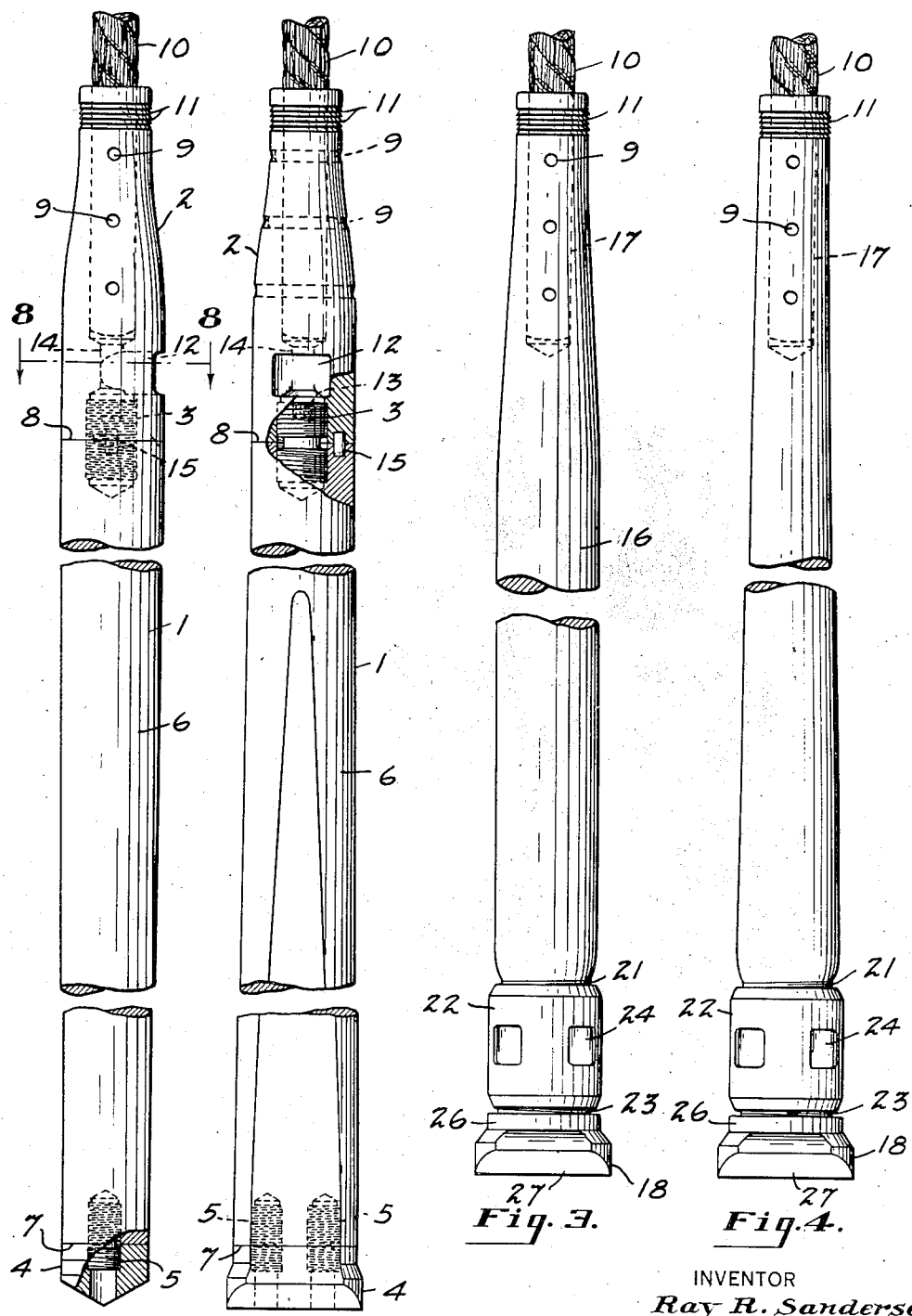

INVENTOR
Ray R. Sanderson
BY Evans + McCoy
ATTORNEYS

Patented Mar. 19, 1935

1,994,792

UNITED STATES PATENT OFFICE 1,994,792

DRILL BIT

Ray R. Sanderson, Orrville, Ohio

Application August 8, 1932, Serial No. 627,923

2 Claims. (Cl. 255—63)

This invention relates to tools for use in churn and percussion drilling and more particularly to a tool assembly for use in deep well drilling.

Substantially ninety percent of the failures from breakage between tool sections are caused by failure of the connection between the drill blade and the stem. The joint between the rope socket and the stem breaks very rarely, but this joint also fails from time-to-time.

The industrially successful and substantially universally used pin and box joint at the connection between the drill blade and the stem in such breakage cases is usually found to be the source of the fracture. The transverse waves of impact vibrations set up within the tool each time it drops are believed to concentrate or localize at the weaker portions of the tool or where changes are made in the character or section of metal from which the tool shaft is formed.

In the drilling of deep wells in which the drill tool assembly is from thirty to fifty feet in length and the hole is of small diameter, it is often impossible to recover a lost tool, even when the drilling of the hole has cost many thousands of dollars and when the hole is plugged by a lost tool, the hole cannot be used.

In deep well drilling, single piece tool assemblies have heretofore been used in which bit steel is welded to the steel forming the remainder of the tool shaft. These tools are of great weight, often weighing thousands of pounds, and the tool lengths are such that the tool shaft is subjected to severe strains each time it is dropped in the hole in the drilling operations. Knowing that the breakage of such a tool in a deep well will most likely result in a loss of all of the work previously expended in forming the hole, the operators are content to use such single piece tools, even when much time and labor is required for the resharpening of the tool after it becomes dull. These tools are not made of a single character of metal because the bit steel that forms the cutting face of the tool is of too brittle a structure for the entire length of shaft and the high tensile steel used in the remainder of the shaft will not form a good cutting face. Furthermore, the impact vibrations developed in the tool shaft tend to concentrate in the zone of the weld and, since the metal structure is somewhat weakened in this zone, breakage often occurs, even when all possible precautions are observed. This invention proposes a single piece tool shaft wherein there are no portions in which abrupt changes in character or section of metal occur, and which substantially eliminates the hazards from breakage in deep well drilling. In cases where the tool might become stuck in the drill hole because of the particular nature of the ground formation, a removable rope socket of conventional form that would provide a joint member of such form that a jar could be interposed between the rope socket and the single piece tool shaft could be used. This structure is unnecessary, except in special characters of ground formation. The tool with the special form of rope socket joint shown herein or with the rope socket formed in the tool body without any joint therein is the more satisfactory construction.

One of the objects of the invention is to provide a single piece tool shaft of the most suitable homogeneous character of metal for the service required and wherein there are no abrupt changes in metal section or character of metal.

Another object of the invention is to provide a single piece homogeneous tool shaft embodying both a bit blade and bit stem of the same character of metal wherein the liability of breakage of the tool shaft is substantially eliminated.

An additional object of the invention is to provide an improved rope socket connection for use with a tool of the character set forth.

A further object of the invention is to provide an improved replaceable bit tip construction that may be used satisfactorily with a tool shaft of round section.

Another object of the invention is to provide a single piece tool shaft and removable drill bit tip construction that greatly extends the operating life of the tool in the drill hole and greatly simplifies the labor of providing a new cutting face for the tool.

A further object is to provide a drill tool which is relatively inexpensive to manufacture and which embodies many new advantages not heretofore obtained and which is quickly and easily assembled.

With the above and other objects in view which will be apparent to those skilled in the art to which the invention appertains, the invention may be said to consist in the following combinations and associations of parts shown in the drawings in which, Figure 1 is an elevational view, partially in section, of a preferred form of drill tool;

Fig. 2 is a side elevational view shown partially in section and taken at right angles to the view shown in Fig. 1;

Fig. 3 is a side elevational view, partially in section, of a modified form of drill tool;

Fig. 4 is a side elevational view of an additional modification of a tool embodying the invention;

Figures 5, 6:
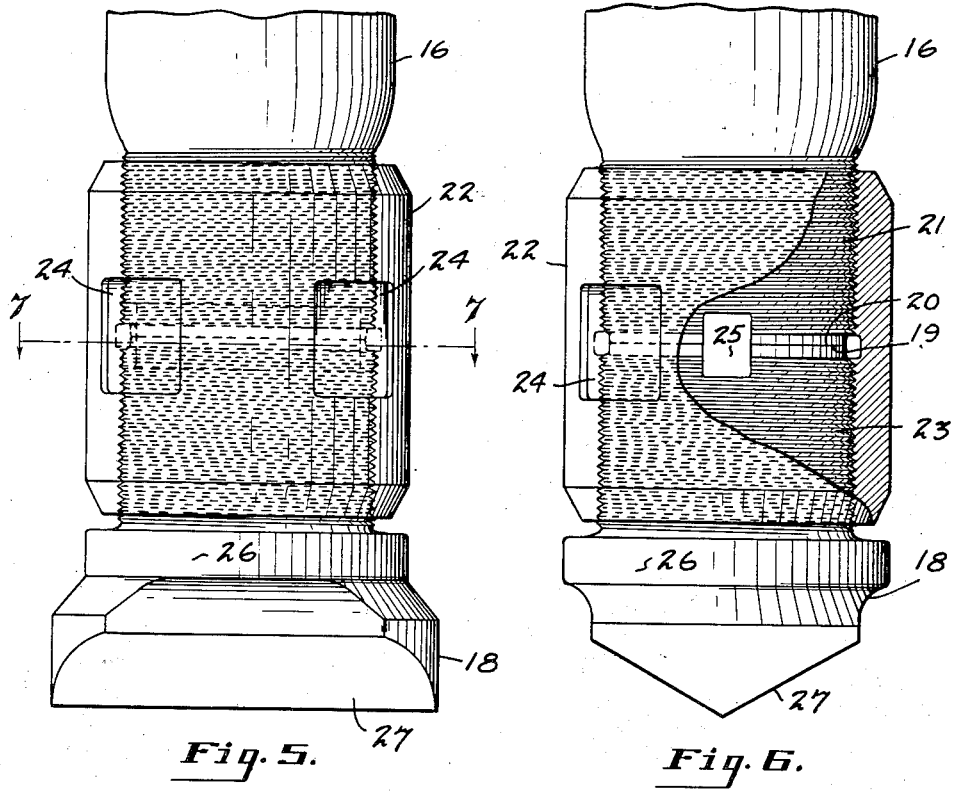
Fig. 5 is an enlarged side elevational view of the removable cutting tip for the tools shown in Figs. 3 and 4.
Fig. 6 is a side elevational view taken at right angles to the view shown in Fig. 5 and showing parts broken away.

Figures 1 and 2 of the drawings show a drill tool embodying the invention and comprising a body portion 1 to the upper end of which a rope socket 2 is secured by a threaded stud 3 and to the lower end of which a suitable cutting tip 4 is secured by means of a pair of suitable studs 5.

The body 1 of the drill is of substantially the same sectional area throughout its length. The flattened blade portion 6 of the lower end of the tool merges very gradually into the upper cylindrical portion, so that there are no zones of abrupt change of section any place in the tool body. The tool body is preferably formed of sixty percent carbon and two and one-half percent nickel steel or other suitable high tensile metal that will not shatter or break in service. For the most hazardous service the tool body is hardened and tempered over its entire length, whereas for other service only the lower end portion of the tool body is hardened, so that the impact face 7 of the tool will not deform in service.

The upper end of the tool body has the end face 8 ground to mate with the corresponding face of the rope socket member 2 and is provided with a suitably threaded socket for receiving the stud 3 that holds the rope socket member to the tool body.

The upper part of the body portion of the rope socket member 2 is of conventional form embodying a series of suitable apertures for receiving the rope-securing pins 9 that hold the end of the drill rope 10 anchored in place. Suitable fishing slips 11 are formed on the upper end of the rope socket member for assistance in fishing for the tool if the rope tears free from the rope socket member. A suitable wrench aperture 12 is formed in the side of the socket member for providing access to the wrench socket 13 that is formed in the upper end of the securing stud 3. The wrench socket 13 is also accessible from the rope socket through the aperture 14 before the rope end is anchored in place.

A suitable dowel 15 prevents loosening of the rope socket member by reason of relative movement between the rope socket member 2 and the tool body 1. The anchor stud 3 has a righthand thread on its lower end and a lefthand thread on its upper end for drawing the mating faces of the tool body and the rope socket members together.

The lower end of the tool body carries the cutting tip 4 that is preferably of the general character described and claimed in my copending application Serial No. 614,866 that was filed on June 2, 1932 and reference is made to that application for a more detailed discussion of the tip. The tip 4 may, however, be of any other suitable character suitable for this service, although it must be of very small size and light weight and be positively secured in place. The anchor studs 5 are also of the right-left threaded form, having the self-tightening characteristics more carefully described in my application above referred to.

A modified form of tool body 16 is shown in Fig. 3, wherein the cross section of the body is circular over its entire length. The hardening and tempering of this form of tool body is the same as for the tool body shown in Figs. 1 and 2. The upper end of the tool body 16 has the rope socket 17 formed directly in the body portion, so that there is no joint any place in the body portion of the tool. The lower end of the tool body has a cutting tip 18 of the character shown in Figs. 5, 6 and 7, to which reference may now be had. The impact face 19 of the tool body is formed normal to the axis of the tool body and is accurately ground to properly register with the impact face 20 of the bit tip 18. The lower end portion of the tool body 16 is suitably threaded as at 21 for receiving the securing sleeve 22 that rigidly connects the tip 18 to the tool body 16. The bit tip also has a threaded portion 23 that engages suitable threads of the sleeve 22. The tip-engaging portion of the sleeve is threaded in the opposite direction from the portion that engages the tool body in order to insure a connection between the body portion and the bit tip that will remain tight in service. Compression of the metal of the tool body and the threaded portion of the tip under impact in service tends to tighten this connection in service. The sleeve 22 also has suitable wrench squares 24 formed thereon for facilitating proper tightening of the sleeve. A suitable key 25 that interengages the tip and tool body prevents relative movement between these parts in service.

The tip member 18 has a collar portion 26 that protects the sleeve 22 from injurious impact with rock pieces in the drill hole and serves to strengthen the bit tip. The cutting face 27 of the bit tip is of any suitable form for working in the particular ground formation encountered.

The tool shown in Fig. 4 differs from the body of the tool shown in Fig. 3 only in the uniform taper of the body portion 16. The remaining parts and characteristics of this tool have heretofore been described.

Figure 7:
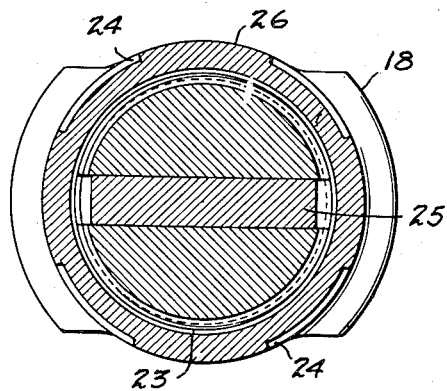
Fig. 7 is a sectional view, taken along the lines 7—7 of Fig. 5.
Figure 8:
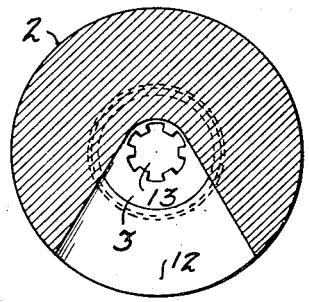
Fig. 8 is a cross sectional view taken on the line 8—8 of Fig. 1.

The bit tip construction shown in Figs. 5, 6 and 7 has many advantageous characteristics that will be apparent to those skilled in the art.

From the foregoing description it will be seen that the tool herein described has a body portion wherein there are no points of concentration of impact vibrations and where all portions of the body portion are of homogeneous character, high tensile metal that will not crack or shatter in service and wherein the tool body may be formed of the best character of metal for the service required of it. The absence of the joints that cause the greatest hazards in service, and the absence of any welded connections in the shaft, and the further absence of abrupt changes in cross sectional contour prevent such localization of stresses in the tool shaft as might result in breaking the shaft in service.

The proposed form of rope socket connection is particularly strong and of light weight and is of such character as to remain secure for all character of service.

It is to be understood that the particular embodiments of the invention shown and described are presented for the purposes of illustration and explanation, and that various modifications may be made without departing from the invention as defined in the appended claims.

What I claim is:

1. A drill bit assembly comprising a drill bit tip, a drill bit blade of solid section, a rope socket carried by said bit blade at one end thereof, an impact face forming a part of said bit tip and being substantially normal to the longitudinal axis of said bit blade assembly, a threaded portion forming a part of said bit tip, an impact face forming a part of said bit blade and being substantially normal to the longitudinal axis of said bit blade and being of contact area and contour that are substantially equivalent to and conforming to the contact area and contour respectively of the impact face forming a part of said bit tip, a threaded portion forming a part of said bit blade and substantially registering with the threaded portion forming a part of said bit tip, separate means continuously mounted on the threaded areas of both said bit blade and said bit tip and bridging the junction of said bit blade and said bit tip for rigidly joining said bit tip to said bit blade, a plurality of wrench engaging land portions disposed externally of said separate means and separate means adapted for being interposed between said bit tip and said bit blade for preventing relative rotary movement therebetween.

2. A drill bit assembly comprising in combination a substantially tapered drill bit blade having a rope socket end and an impact end, a threaded portion of said bit blade extending from the impact end of said bit blade longitudinally thereof, an annular shoulder forming a part of said bit blade and positioned adjacent said threaded portion, a pair of impact faces forming the impact end of said bit blade and positioned substantially normal to the axis of said bit blade and each in the shape of a substantial segment of a circle and spaced from each other, a bit tip comprising a cutting face, a radially outwardly extending protecting flange disposed adjacent said cutting face and forming a part of said bit tip, a threaded portion of said bit tip adjacent said protecting flange and remote from said cutting face and threaded in a direction opposite to the threads formed on said bit blade, a plurality of spaced impact faces substantially normal to the longitudinal axis of said bit tip and each shaped as a substantial segment of a circle and registering with said impact faces on the bit blade, a separate key member positioned between said pairs of spaced impact faces of both said bit blade and said bit tip for preventing substantial rotary motion therebetween, a collar having internally disposed threaded portions of opposite direction threads at its opposite ends and adapted for substantially simultaneously threading on the threaded portions of both said bit blade and said bit tip, and a plurality of wrench lands positioned externally of said inwardly threaded collar.

RAY R. SANDERSON.